(12) United States Patent
Kimoto et al.

(10) Patent No.: US 6,278,259 B1
(45) Date of Patent: Aug. 21, 2001

(54) GAS DISCHARGING DEVICE FOR BATTERY PACK

(75) Inventors: Shinya Kimoto; Ko Watanabe, both of Toyohashi; Toyohiko Eto, Toyota, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/684,241

(22) Filed: Oct. 6, 2000

(30) Foreign Application Priority Data

Oct. 8, 1999 (JP) .................................................. 11-288799

(51) Int. Cl.[7] ....................................................... H02J 7/04

(52) U.S. Cl. ............................................................. 320/147

(58) Field of Search ..................................... 320/107, 110, 320/112, 124, 147, DIG. 17; 429/53, 56, 57, 58, 59, 98, 99, 100

(56) References Cited

U.S. PATENT DOCUMENTS

| | | | | |
|---|---|---|---|---|
| 3,005,943 | * | 10/1961 | Jaffe | 320/147 X |
| 3,031,517 | * | 4/1962 | Peters | 320/147 |
| 4,782,279 | * | 11/1988 | Selanger | 320/147 |
| 6,033,795 | * | 3/2000 | Broussely et al. | 429/56 |

FOREIGN PATENT DOCUMENTS 7-245089    9/1995   (JP) .

* cited by examiner

*Primary Examiner*—Edward H. Tso
(74) *Attorney, Agent, or Firm*—Jordan and Hamburg LLP

(57) ABSTRACT

In a battery pack, a plurality of batter modules provided with safety vents for discharging gas are arranged in parallel. A gas discharging device is provided in which discharge outlets of the safety vents of the respective battery modules are connected to at least one discharge gas tube installed in the alignment direction of the battery modules and connected to an external discharging section. The battery modules are connected in a manner that changes in the intervals between the discharge outlets of respective safety vents, due to expansion of the battery modules, are absorbed by expansion or displacement of theat least one discharge gas tube.

17 Claims, 13 Drawing Sheets

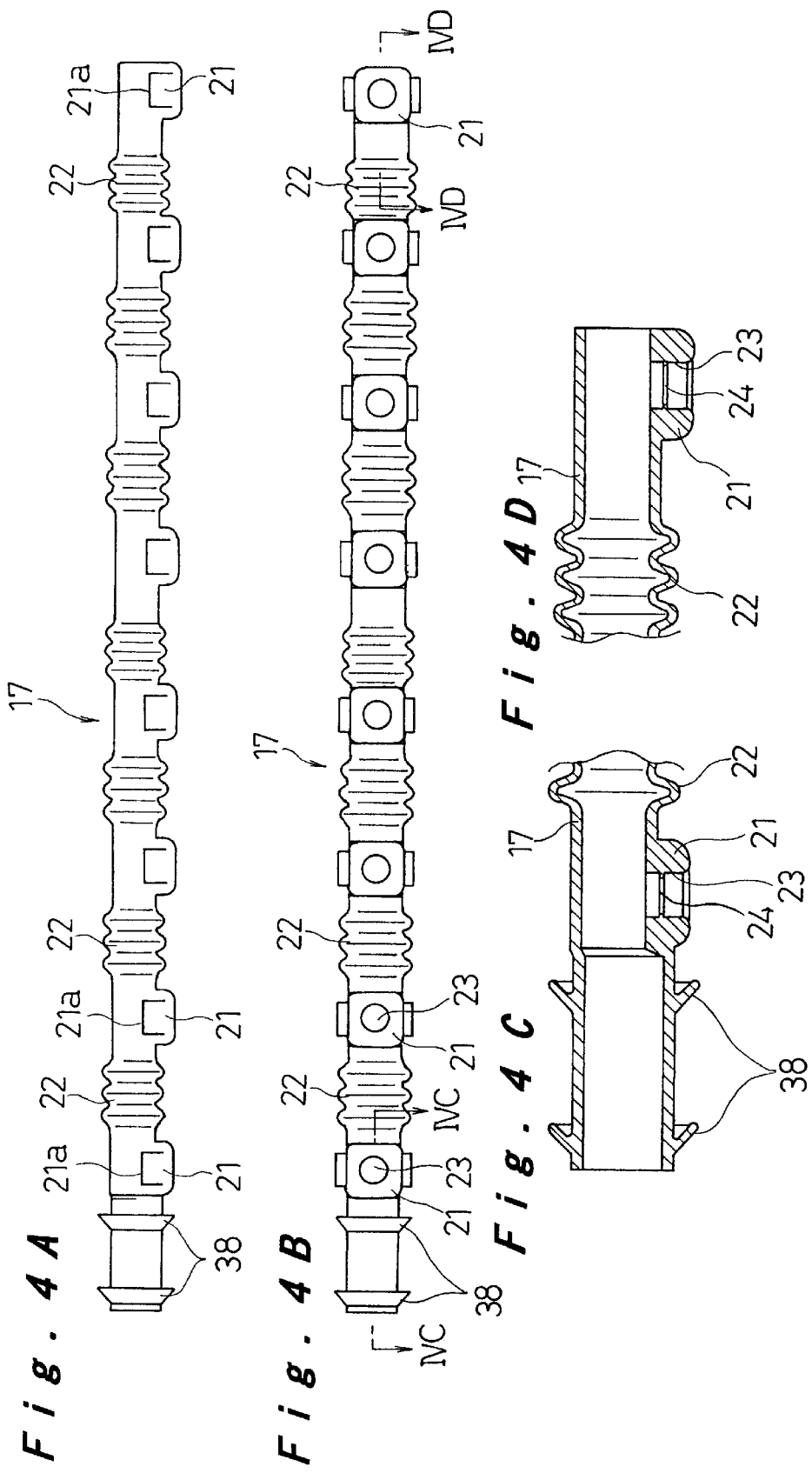

GAS DISCHARGING DEVICE FOR BATTERY PACK

BACKGROUND OF THE INVENTION

The present invention relates to a battery pack, in which a plurality of battery modules provided with safety vents for expelling gas when the internal pressure exceeds a prescribed value are arranged in parallel, and more particularly, the present invention relates to a gas discharging device for discharging the gas expelled from the safety vents to the exterior of the battery pack.

For a driving power supply mounted in an electric vehicle, a battery pack, in which a plurality of battery modules consisting of sealed prismatic cells and provided with safety vents are arranged in parallel, is suitably used. In a battery pack of this kind, when the internal pressure of a battery module rises to a prescribed level or above due to hydrogen gas generated during charging or discharging, the safety vent operates, thereby discharging the hydrogen gas. In order to expel this hydrogen gas into the external atmosphere as a fire-prevention safety measure, a gas discharging device is normally provided in the battery pack.

A prior art gas discharging device for a battery pack is disclosed, for example, in Japanese Laid-open Patent Application No.(Hei)7-245089. Referring to FIG. 14 and FIG. 15, this battery pack 41 comprises a plurality of battery modules 43 (in this example, 24 modules) arranged in parallel in two rows (12 modules in each row, in this example). Discharge outlets 44 of the respective battery modules 43 are disposed in an alternating zig-zag fashion within the battery module groups 42a, 42b in the respective rows, these discharge outlets 44 being connected alternately to discharge gas lines 45a, 45b, 45c, 45d of the respective rows. One end of each discharge gas line is connected respectively to an air discharge section 46.

A T-shaped joint 47 is provided at the gas discharge outlet 44 of each battery module 43. Hose joints 48 are provided projecting from either end of the T-shaped joint 47, and the respective discharge gas lines 45a–45d are constituted by connecting these hose joints 48 in a sequential fashion, by means of discharge gas tubes 49.

In the example illustrated in FIG. 14, the discharge gas lines 45a and 45d, and 45b and 45c, belonging to one battery module group 42a and the other battery module group 42b, are respectively connected at the other ends thereof, by means of connecting lines 50a, 50b, so that, even if a blockage occurs in any one of the discharge gas lines 45a–45d, the gas can still be discharged from the other discharge gas line connected to same.

However, in the conventional composition of a gas discharging device as illustrated in FIG. 14 and FIG. 15, when the battery modules 43 consisting of sealed prismatic cells swell as their internal pressure rises, the interval between the gas discharge outlets 44, 44 increases, as a result of which it may happen that a discharge gas tube 49, that is sequentially connected between hose joints 48 on either end of T-shaped joints 47, is pulled away from the hose joint 48, causing the seal to become incomplete, or in some instances, the discharge gas line 45a–45d may break, and hence there is a risk of leakage of hydrogen gas.

Moreover, since the respective end sections of the discharge gas tubes 49 must be connected in a sealed state to a plurality of hose joints 48, a large amount of labour is required during assembly, and the cost becomes high.

SUMMARY OF THE INVENTION

The present invention was devised with the foregoing in view, an object thereof being to provide a battery pack comprising a gas discharging device in which sealing properties can be ensured, even in cases where battery modules have swollen due to a rise in the internal pressure thereof, whilst also reducing the amount of labour required for assembly and reducing the cost of the battery pack.

To achieve the above object, the present invention provides a battery pack comprising:

a plurality of battery modules arranged in parallel and coupled together in such a manner as to provide a necessary power output, each of said plurality of battery modules being provided with safety vents having discharge outlets for releasing gas therethrough from the battery modules when internal pressure of a battery module has reached a predetermined value; and one or a plurality of discharge gas tube(s) connected to said discharge outlets of the safety vents and arranged along a direction in which the battery modules are aligned, wherein said one or a plurality of discharge gas tube(s) is/are capable of accommodating variations in the intervals between said discharge outlets of the safety vents caused by expansion of the battery modules, by means of extension or expansion of itself/themselves.

Other and further objects, features and advantages of the invention will be apparent more fully from the following description.

BRIEF DESCRIPTION OF THE DRAWINGS

FIGS. 4A–4D illustrate a discharge gas tube according to the present embodiment; FIG. 4A is a front view; FIG. 4B is a bottom view; FIG. 4C is an enlarged sectional view in the direction of arrows IVC—IVC in FIG. 4B; and FIG. 4D is an enlarged sectional view in the direction of arrows IVD—IVD in FIG. 4B;

FIG. 5A is a vertical sectional view, and FIG. 5B is a sectional view in the direction of the arrows VB—VB in FIG. 5A;

FIG. 10A is a front view and FIG. 10B is a bottom view;

DESCRIPTION OF PREFERRED EMBODIMENTS

An embodiment in which the present invention is applied to a battery pack used as a driving power source for an electric vehicle is described below with reference to FIG. 1 through FIG. 11.

Figure 1:
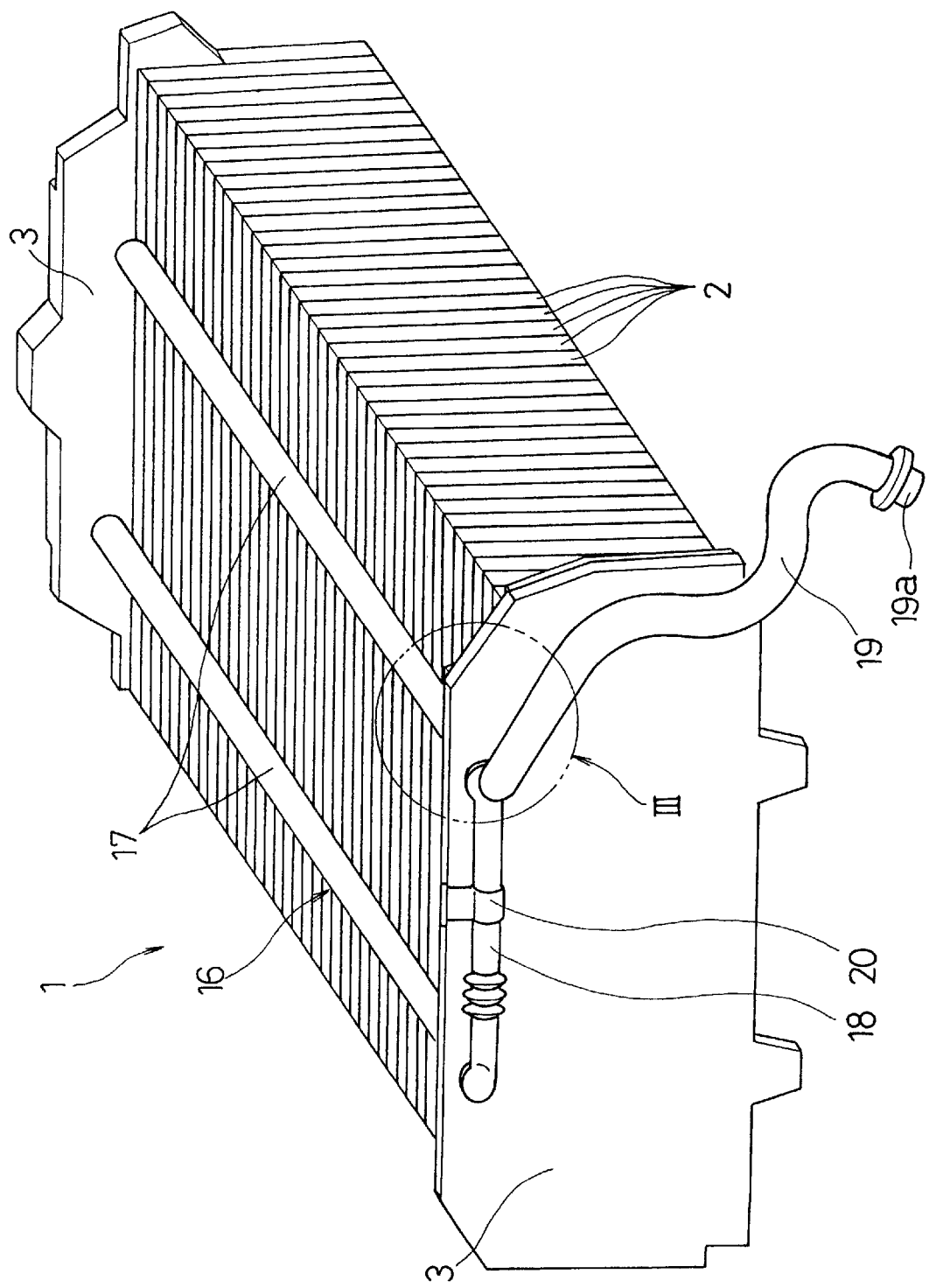
FIG. 1 is an oblique view showing the overall composition of one embodiment of a battery pack according to the present invention.

As shown in FIG. 1, the battery pack 1 according to the present embodiment comprises a plurality of battery modules 2 (in the illustrated example, 38 battery modules 2) consisting of sealed prismatic nickel metal hydride batteries, arranged in parallel. End plates 3 are provided at either end of the battery module alignment, the group of battery modules 2 being bound together by connecting these end plates 3 mutually by means of binding straps (not illustrated). The respective battery modules 2 each are electrically connected in series by means of bus bar modules (not illustrated).

Figure 2:
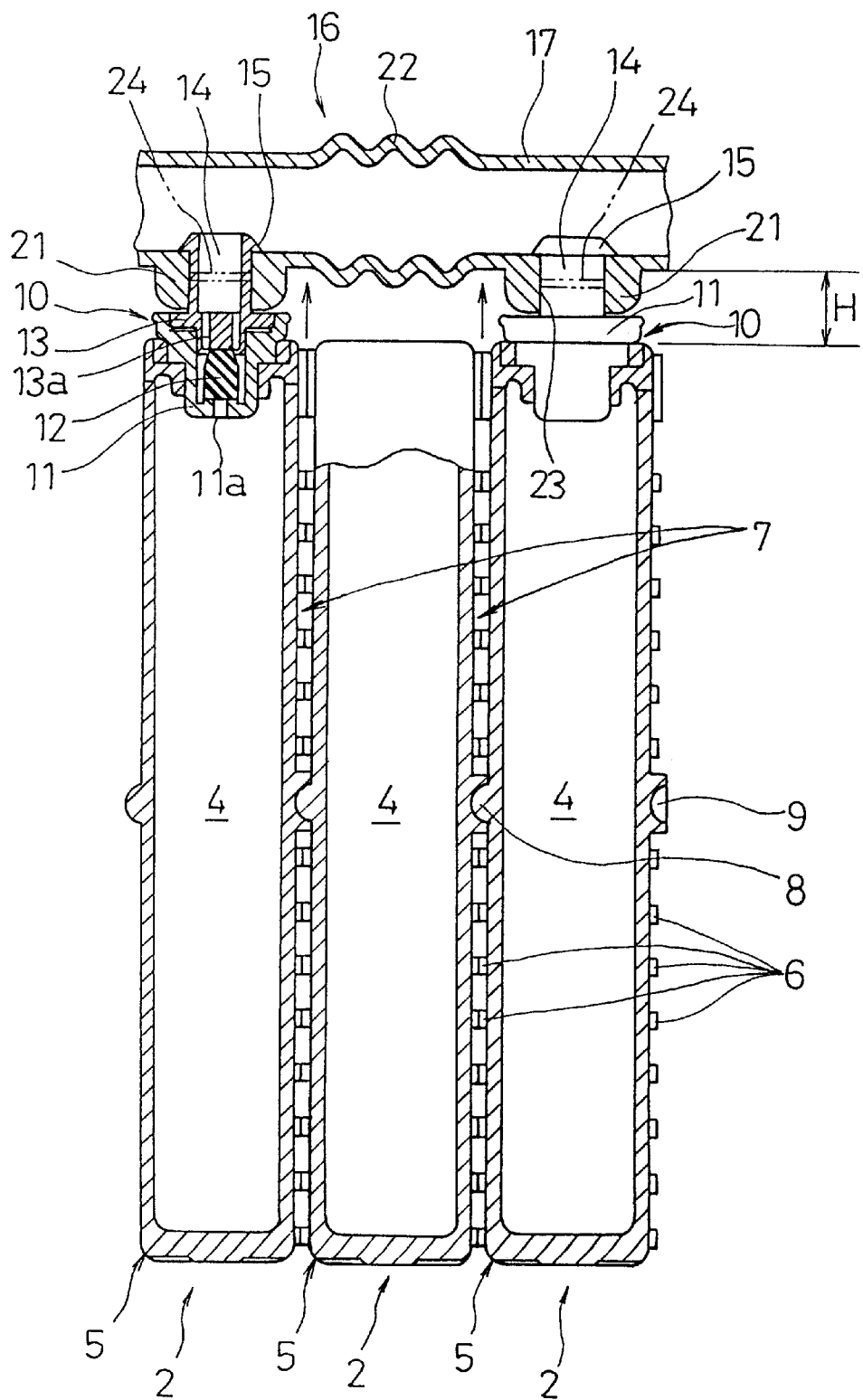
FIG. 2 is a detailed vertical section showing a part of the aforementioned embodiment.
Figure 3:
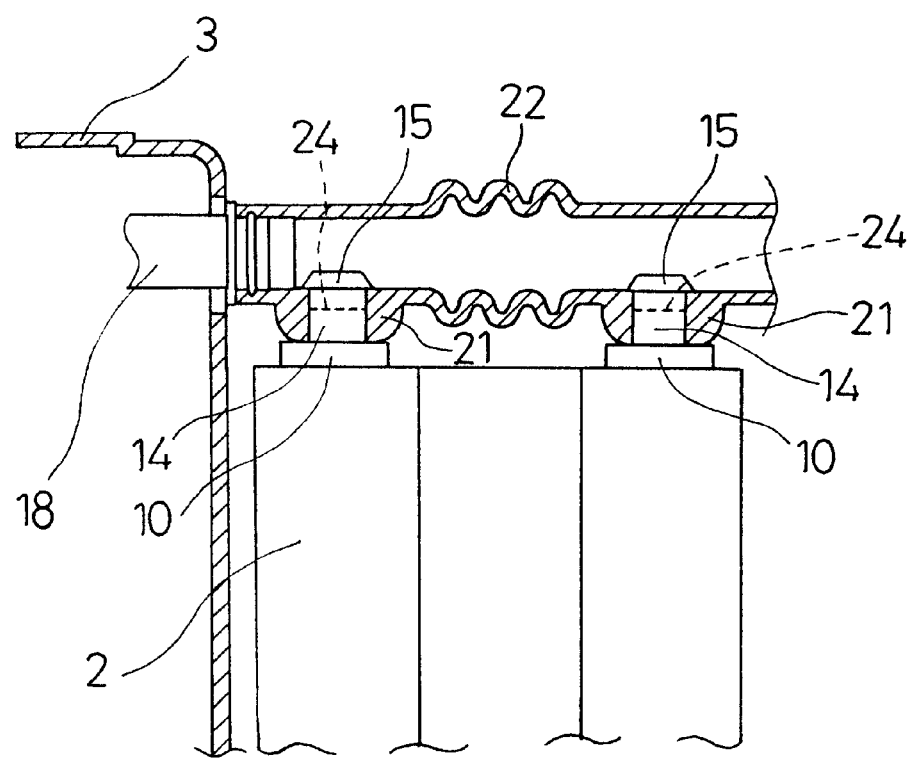
FIG. 3 is a vertical section of part III in FIG. 1.

As shown in FIG. 2, in each battery module 2, a plurality of (in the present embodiment, 6) prismatic cell cases 4 having shorter side faces and longer side faces are mutually joined to form an integrated battery case 5 such that the shorter side faces thereof are shared by adjacent cell cases. Elements for electromotive force (not illustrated) are accommodated inside each cell case 4 to form a cell, and the respective cells are connected in series inside the integrated battery case 5 to form a battery module 2. The respective cell cases 4, 4 in the integrated battery case 5 are mutually connected in such a manner that each cell case 4 has the same internal pressure.

On the longer side faces of the integrated battery cases 5, there are provided rib-shaped projections extending in a vertical direction and provided in positions corresponding to either side edge of the respective cell cases 4, and a plurality of passage forming projections 6, such as circular projections, or the like, formed in a matrix pattern at pitch intervals corresponding to the aforementioned rib-shaped projections, and by mutually butting the respective end portions of the passage forming projections 6 in adjacently positioned battery modules 2, cooling medium passages 7 are formed between respective battery modules 2, 2. On the longer side faces of the integrated battery cases 5, there are also provided locating protrusions 8 and recesses 9 which interlock with each other when the battery modules 2 are arranged in parallel fashion with their longer side faces mutually facing, thereby registering the relative positions of the battery modules 2 in the longitudinal direction.

On the upper wall of the integrated battery case 5 of each battery module 2, a safety vent 10 is provided in a position which is away from the central line thereof in the longitudinal direction, towards one end thereof, by a suitable distance. When the internal pressure of the integrated battery case 5 reaches a certain level or above due to the hydrogen gas generated by charging or discharging, the safety vent operates, whereby the hydrogen gas is discharged. Each safety vent 10 comprises a valve body 12 made from a rubber-like elastic material accommodated inside a valve case 11 having a vent 11a formed in the bottom face thereof. The upper portion of this valve body 12 is sealed in a compressed state by a valve cover 13. A cylindrical discharge outlet 14 which connects to a through hole 13a formed in the valve cover 13 is provided in a projecting manner on the top of the valve cover 13. An umbrella-shaped projection 15 is provided about the outer circumference of the upper end of the discharge outlet 14.

As shown in FIG. 1, a gas discharging device 16 is provided above the battery pack 1 in order to discharge all of the hydrogen gas expelled by the safety vents 10 of the respective battery modules 2. In the battery pack 1, since the respective battery modules 2 are connected in series, they are aligned sequentially facing in opposite directions, in such a manner that respective positive electrode and negative electrode connection terminals located at either end of each battery module are positioned adjacently in an alternating fashion. Consequently, the safety vents 10 are disposed in a zig-zag fashion in the direction in which the battery modules 2 are aligned, and hence the discharge outlets 14 thereof are arranged in two rows, at every alternate battery module 2 in the alignment direction thereof. Therefore, the gas discharging device 16 comprises a pair of discharge gas tubes 17 running approximately the whole length of the alignment of battery modules 2, an external discharge tube 18 to which the respective ends of the aforementioned discharge gas tubes 17 projecting beyond the outer side of the end plate 3 are connected, and a drain hose 19 which is connected to one end of the external discharge tube 18. The center portion of the external discharge tube 18 is supported by a supporting clip 20. The discharge section 19a at the front end of the drain hose 19 is left open at a position below the battery pack 1.

As shown in FIG. 2 to FIG. 5, discharge outlet connecting sections 21 having approximately a square shape in plan view are provided in a downward projecting fashion in the discharge gas tubes 17, at positions corresponding to the discharge outlets 14 of the safety vents 10. Moreover, expandable bellows 22 are formed between respective discharge outlet connecting sections 21, 21, so that any change in the interval between the discharge outlets 14, 14 of respective safety vents 10, due to swelling of the battery modules 2, can be absorbed. In FIGS. 4A–4C, numeral 38 denotes a sealing flange formed covering the peripheral space of the discharge gas tube 17, which serves to prevent any external leakage of the cooling medium inside the battery pack 1 via the through holes formed in the end plates 3 in order to pass the respective ends of the discharge gas tubes 17. The sealing flanges 38 are provided in two locations on each discharge gas tube 17, an appropriate distance apart from each other, so that they are still compatible even if differently shaped end plates 3 are used.

A cylindrical connecting hole 23 is formed in each discharge outlet connecting section 21, in a perpendicular direction to the core axis of the discharge gas tube 17, in such a manner that the connecting hole 23 engages with a discharge outlet 14 in a sealed state. A sealing projection 24 is formed on the inner circumference of the central portion of the connecting hole 23, in order to ensure good sealing properties. Moreover, as shown in FIG. 5B, the length L of the portion where the connecting hole 23 and the discharge outlet 14 engage with each other is set to a length equal to or exceeding the diameter D of the discharge outlet 14, so that a sealed state is ensured even when the discharge gas tube 17 is inclined with significant force. When the connecting hole 23 and discharge outlet 14 are mutually engaged, a lower end step face of the umbrella-shaped projection 15 confronts the upper end face of the connecting hole 23, thereby preventing unwanted detachment of the discharge outlet connecting section 21.

In each discharge outlet connecting section 21, the thickness of material surrounding the connecting hole 23 is set greater than the other portions of the discharge gas tube 17, thereby providing a high degree of rigidity. It is also possible to increase the rigidity by altering the hardness of the rubber material used. Moreover, a pressing step section 21a projecting from the outer circumference of the discharge gas tube 17 is provided on either side of the discharge outlet connecting section 21. By pushing this pressing step section 21a from above by means of a pressing tool F which straddles the upper portion of the discharge gas tube 17, as illustrated by the broken lines in FIG. 5B, the connecting hole 23 is caused to engage with the discharge outlet 14, thereby connecting the discharge outlet 14 to the discharge gas tube 17.

The length of the portion of the discharge outlet connecting section 21 which engages with the discharge outlet 14, in other words, the length L of the connecting hole 23 in the illustrated example, is set shorter than the length N of the lower portion of the discharge outlet 14 below the umbrella-shaped projection 15. Thus a gap S is formed between the base of the discharge outlet 14 of the safety vent 10 and the lower end of the discharge outlet connecting section 21. Thereby, the connecting hole 23 can be fitted completely and securely onto the discharge outlet 14 by pressing the discharge outlet connecting section 21 from above, and moreover, the operator can readily feel complete engagement therebetween.

As illustrated in FIG. 2, when the discharge gas tubes 17 have been connected to the discharge outlets 14 of each safety vent 10 in the foregoing manner, the portions of the gas discharge tubes 17 positioned over the cooling medium passages 7 between the battery modules 2, 2 are portions having the smallest diameter dimension in the horizontal direction between the discharge outlet connecting section 21 and the bellows 22, and therefore any adverse effects on the flow of cooling medium flowing along the cooling medium passages 7 as indicated by the arrows is prevented as far as possible. Moreover, the distance H between the upper end face of the integrated battery case 5 of a battery module 2 and the lower face of the discharge gas tube 17 is set to a dimension whereby the increase in the flow resistance of the cooling medium flowing from the cooling medium passages 7 caused by the discharge gas tube 17 is less than 10%. In order to distance the lower face of the discharge gas tube 17 from the upper face of the battery modules 2 in this manner, as illustrated in FIG. 5B, the discharge gas tube 17 is formed into a tunnel shape having a flat-shaped lower face portion, and the side angle sections thereof being curved in such a manner that the flow resistance to the cooling medium is reduced to a minimum.

Figure 5A:
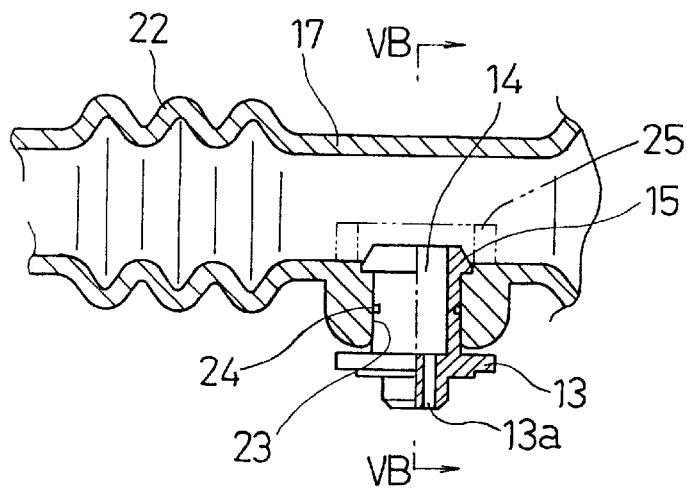
FIGS. 5A and 5B show details of a connecting section between a discharge gas tube and a discharge outlet of a safety vent.
Figure 5B:
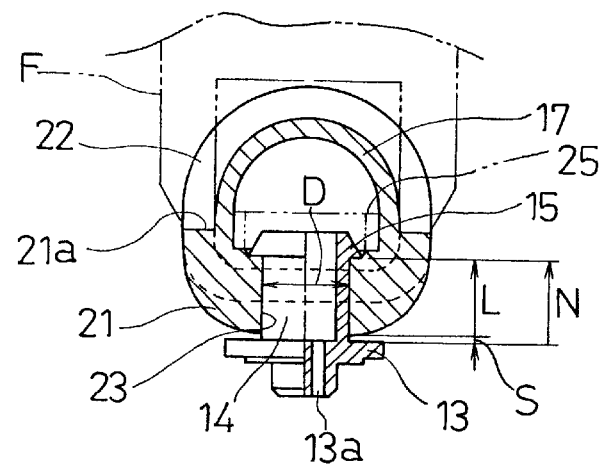

Instead of forming a projecting pressing step section 21a on either side of the discharge outlet connecting section 21, as illustrated by the broken lines in FIG. 5A and FIG. 5B, it is also possible to provide a shoulder section 25 with a high degree of hardness in the discharge gas tube 17 on the upper face of the discharge outlet connecting section 21, in such a manner that it surrounds the connecting hole 23 and projects upwards from the upper end of the discharge outlet 14. By adopting this composition, it becomes possible to engage the connecting hole 23 of the discharge outlet connecting section 21 with the discharge outlet 14 in a simple and secure manner, by pressing the upper portion of the discharge gas tube 17. The shoulder section 25 may also be provided on either side of the connecting hole 23 in direction of the tube core axis, in such a manner that either end thereof connects with the side walls of the discharge gas tube 17.

Figure 6:
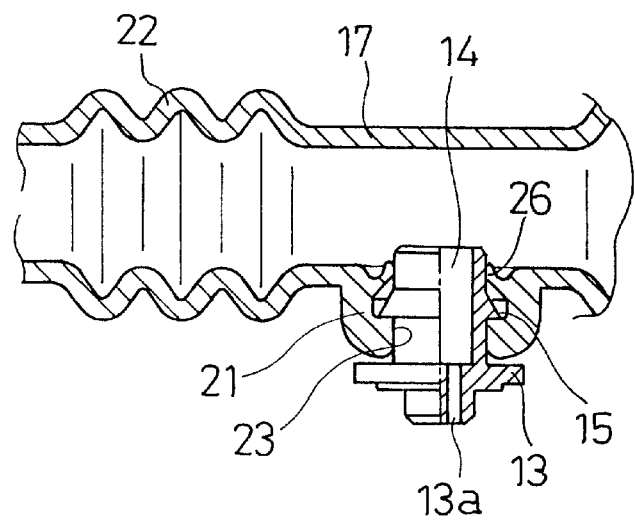
FIG. 6 is a vertical sectional view showing a detail of a modified example of a connecting section between a discharge gas tube and a discharge outlet of a safety vent.

In the structure for connecting the discharge outlet 14 of a safety vent 10 with a discharge outlet connecting section 21 described with respect to FIG. 2 through FIG. 5, an umbrella-shaped projection 15 is provided about the outer circumference of the upper end of the discharge outlet 14. However, as shown in FIG. 6, it is also possible to adopt a composition in which an umbrella-shaped projection 15 is provided about the outer circumference of the discharge outlet 14 of the safety vent 10, in a central portion thereof with respect to the axial direction. In this case, the connecting hole 23 of the discharge outlet connecting section 21 is formed with a larger diameter than this umbrella-shaped projection 15 in the upper portion thereof. Further, an annular lip which presses against the outer diameter of the front end portion of the discharge outlet 14 is provided in the inner circumference of the upper portion of the connecting hole 23.

Figure 7:
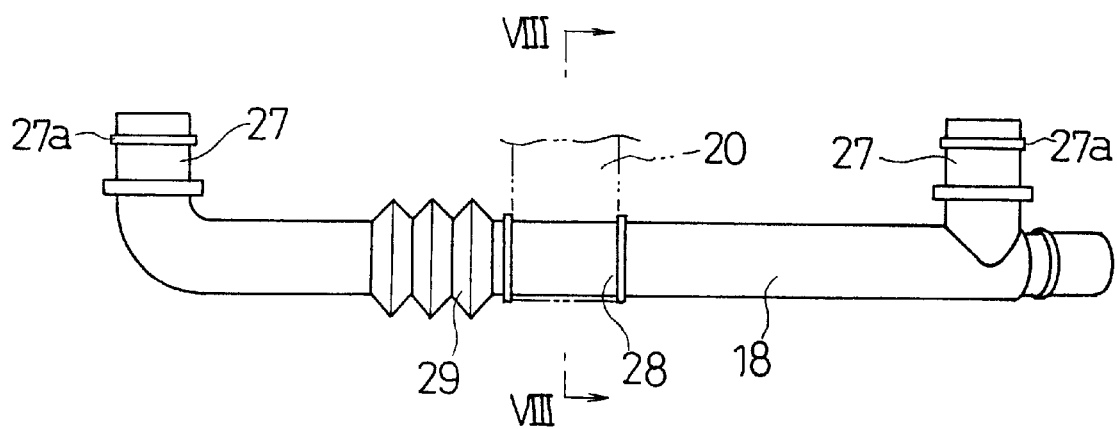
FIG. 7 is a plan view of an external discharging tube according to the aforementioned embodiment.

As shown in FIG. 7, the external discharge tube 18 is provided with a pair of connection apertures 27 formed by bending into an L shape or branching into a T shape for connecting discharge gas tubes 17, in the vicinity of one end and the other end thereof. Numeral 27a denotes a sealing projection provided about the external circumference of a connection aperture 27. Moreover, an interlocking section 28 for the supporting clip 20 which supports the external discharge tube 18, and a bellows 29 for regulating variation in the interval between the discharge gas tubes 17, 17, are provided between the connection apertures 27, 27.

Figure 8:
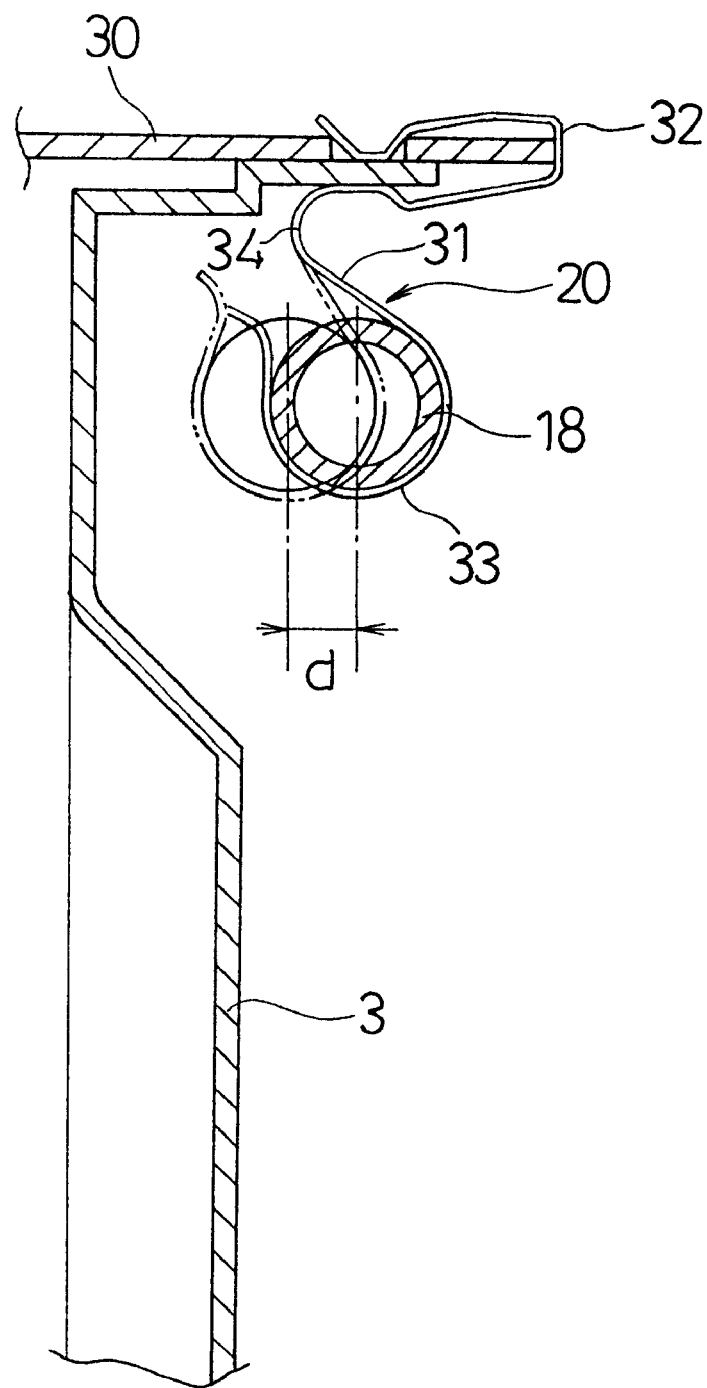
FIG. 8 is a sectional view in the direction of arrows VIII—VIII in FIG. 7, showing a composition for attaching an external discharging tube according to the aforementioned embodiment.

As illustrated in FIG. 8, the supporting clip 20 consists of a resilient strip 31 having spring properties. An engaging section 32 which engages in the form of a clip with the fixed end plate 3 and a cover member 30 of the battery pack 1 that is coupled and fixed to the upper face of the end plate 3 is formed at one end of the resilient strip 31, a curved section 34 is formed in the central portion thereof, and a holding section 33 for surrounding and holding the external discharge tube 18 is formed at the other end of the resilient strip 31, whereby the external discharge tube 18 is held in such a manner that it can be displaced very readily through a prescribed amount of displacement d, towards the endplate 3, as illustrated by the broken lines in the diagram.

In the present embodiment, since the discharge section 19a of the drain hose 19 is located below the battery pack 1, if the battery pack 1 is left in a state where there is hydrogen gas remaining inside the discharge gas tubes 17, without the atmosphere inside the sealed space of the battery pack 1 being discharged forcibly, then the hydrogen gas in the discharge gas tubes 17 may gradually permeate through the discharge gas tubes 17, causing the density of hydrogen gas in the sealed space of the battery pack 1 to rise, and hence there is a risk that the hydrogen gas density inside the sealed space may reach the explosive threshold of 4% or above.

Regarding the volume of hydrogen gas permeating through the discharge gas tubes 17, taking the surface area of the discharge gas tubes 17 as A, the thickness as L, the hydrogen permeability coefficient as $\alpha(\times 10^{-17}\ m^4/N.S)$, the pressure differential as $\Delta p$, and the hydrogen permeation time as t, the amount of permeating hydrogen W in time t is given by:

$$W = \alpha \cdot \Delta p \cdot t \cdot A/L$$

Figure 9:
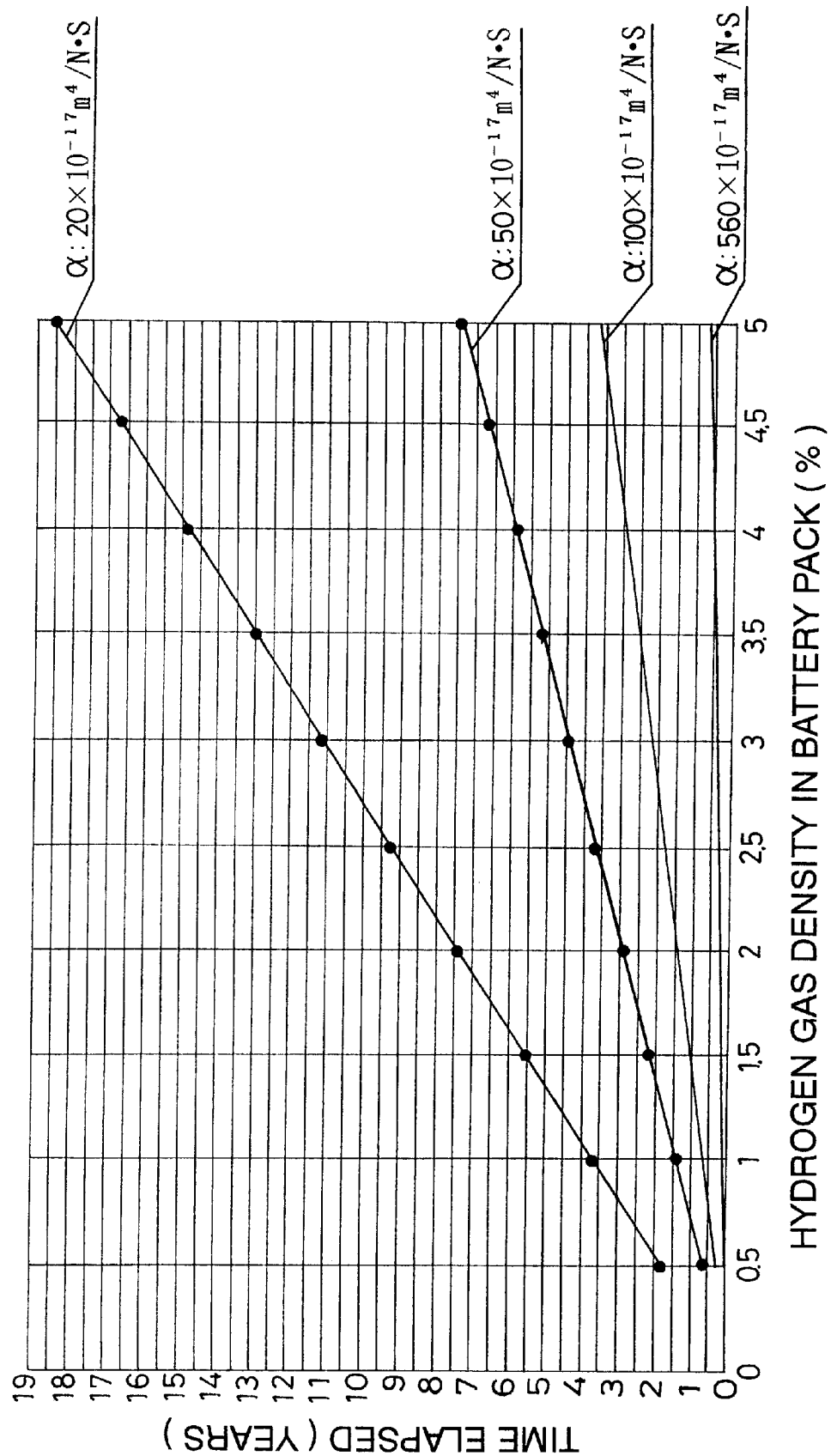
FIG. 9 is a graph showing the relationship between the hydrogen permeability of a discharge gas tube and the hydrogen density in a battery pack over time, according to the present invention.

Since the hydrogen permeability coefficient $\alpha$ is governed significantly by the temperature and hose material properties, in practice, the hydrogen gas density inside the battery pack 1 varies greatly depending on the operating temperature of the battery pack 1 and the rubber material used for the discharge gas tubes 17. Taking consideration of the fact that the hydrogen permeability coefficient α for various types of rubber at normal temperature is 20–40, whilst the hydrogen permeability coefficient α for rubber at 50° C. is 30–560, the relationship between the actual hydrogen gas density inside the battery pack 1 and the hydrogen permeation time t was calculated respectively for values of α=20, 50, 100 and 560. The corresponding results are shown in FIG. 9. From FIG. 9, in the case of a hydrogen permeability coefficient α of 560, which constitutes the worst-case operating conditions, the hydrogen gas density reaches a value of 2%, constituting the 4% explosion threshold divided by a safety factor of 2, in a period of 0.25 years. Therefore, in the discharge gas tubes 17 of the present embodiment, the diameter, thickness and material of the discharge gas tubes are selected in such a manner that there is no possibility of the density of hydrogen gas inside the sealed space within the battery pack 1 reaching a value of 2% or above within 0.25 years due to hydrogen gas permeating the discharge gas tubes 17.

According to the gas discharging device 16 having the composition described above, in cases where the intervals between the discharge outlets 14 of the safety vents 10 increase in size due to swelling of the integrated battery cases 5 of the battery modules 2 as a result of increased internal pressure, this change in the intervals can be absorbed by expansion of the bellows 22 of the discharge gas tubes 17, thereby preventing excessive forces from acting on the connecting sections between the discharge gas tubes 17 and discharge outlets 14, avoiding the risk that the seals therebetween may become incomplete, and hence reliably preventing leakage of hydrogen gas.

Furthermore, since the external discharge tube 18 connected to one end of either discharge gas tube 17 is installed displaceably in the alignment direction of the battery modules 2, by means of the supporting clip 20, even in cases where the battery module 2 adjacent to the end plate 3 expands, causing the ends of the discharge gas tubes 17 to be moved further out from the end plate 3, the external discharge tube 18 is displaced accordingly, as illustrated by the broken lines in FIG. 8, and therefore excessive forces are prevented from acting on the connecting sections between the ends of the discharge gas tubes 17 and external discharge tube 18, thereby avoiding the risk that the seals therebetween may become incomplete, and hence reliably preventing leakage of hydrogen gas. Furthermore, since the supporting clip 20 is constituted by a resilient strip 31 having spring properties, the aforementioned action can be obtained by means of a simple and inexpensive composition.

Moreover, since cylindrical connecting holes 23, into which the discharge outlets 14 of the safety vents 10 engage in a sealed state, are formed in the discharge outlet connecting sections 21 of the discharge gas tubes 17, in a perpendicular direction to the longitudinal core axis of the discharge gas tubes 17, the connecting holes 23 can be engaged with the cylindrical discharge outlets 14 simply by pressing the discharge outlet connecting sections 21 in the direction of the discharge outlets 14, and hence the amount of labour involved in assembly is reduced and costs can also be reduced. Since the rigidity of the discharge outlet connecting sections 21 is higher than that of the other portions of the discharge gas tubes 17, it is possible to avoid complication of the connection task due to accidental deformation of the discharge outlet connecting sections 21 when connecting same to the discharge outlets 14, and hence the ease of the connecting operation is improved.

A shoulder section 25 with a high degree of hardness projecting upwards for a significant distance from the front end of the discharge outlet 14 of the safety vent 10 can be provided inside the tube on the upper portion of each discharge outlet connecting section 21 of the discharge gas tube 17, so that, by pressing on the upper portion of the discharge outlet connecting section 21 of the discharge gas tube 17 when connecting same, it is possible to push the discharge outlet connecting section 21 until it is fully engaged with the discharge outlet 14, by means of the shoulder section 25, without interfering with the upper face of the discharge outlet 14, and hence the connection operation can be performed in a simple and easy manner.

A gap S is formed between the lower end of the discharge outlet connecting section 21 of the discharge gas tube 17 and the base portion of the discharge outlet 14, in order to prevent a situation where the discharge outlet connecting section 21 does not engage completely with the discharge outlet 14 due to the lower end of the discharge outlet connecting section 21 confronting the base portion of the safety vent 10. Hence, a completely connected state is obtained wherein the connecting hole 23 has passed fully over the umbrella-shaped projection 15, and such completely connected state can be confirmed appropriately by the feel of the hole 23 passing over the projecting section 15.

Since the umbrella-shaped projection 15 on the upper end of each discharge outlet 14 engages with the upper face of the discharge outlet connecting section 21 in the aforementioned connected state, it is possible to prevent the discharge gas tube 17 from becoming detached inadvertently, even in cases where an upward external force acts upon the discharge gas tube 17.

Alternatively, as illustrated in FIG. 6, an umbrella-shaped projection 15 can be provided about the outer circumference of the discharge outlet. 14 of each safety vent 10, in the center portion thereof in the axial direction, with an annular lip 26 which presses against the outer circumference of the front end portion of the discharge outlet 14 being provided on the inner circumference of the connecting hole 23 at the tube side end thereof. Thereby, inadvertent detachment of the discharge gas tube 17 can be prevented, and furthermore, when the internal pressure of the relevant section rises suddenly as the safety vent 10 operates and gas is discharged, the annular lip 26 displays further enhanced sealing properties due to the aforementioned gas pressure, and hence it is possible to ensure good sealing properties even in cases where gas is discharged at high pressure.

Also, as described above, the interval H between the upper faces of the battery modules 2 and the lower faces of the discharge gas tubes 17 is set to a dimension whereby the discharge gas tubes 17 cause less than a 10% increase in the flow resistance of the cooling medium flowing from the cooling medium passages 7 provided between the battery modules 2, 2. Therefore, the discharge gas tubes 17 themselves do not significantly lower the cooling properties of the battery modules 2, and hence any adverse effects on the cooling properties of the battery modules 2 can be prevented. Moreover, since the portions of the discharge gas tubes 17 positioned opposing the cooling medium passages 7 have the smallest diameter dimension in the horizontal direction, rather than the discharge outlet connecting sections 21 or bellows 22, it is possible to minimize reduction of the cooling properties of the battery modules 2 at the locations where the discharge gas tubes 17 are provided.

Figure 10A:
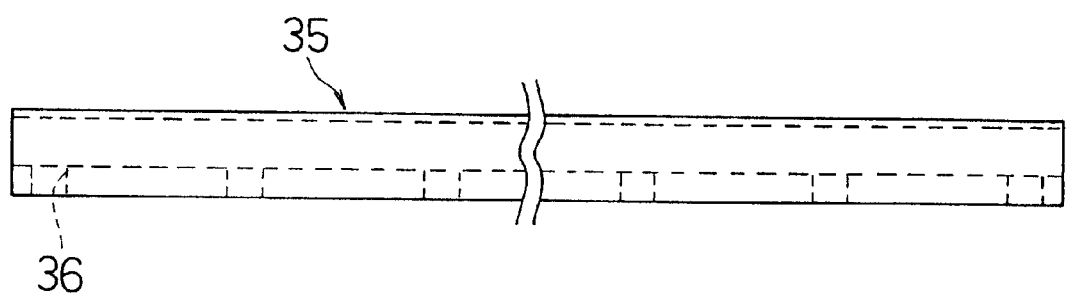
FIGS. 10A and 10C show a modified example of a discharge gas tube according to the present invention.
Figure 10B:
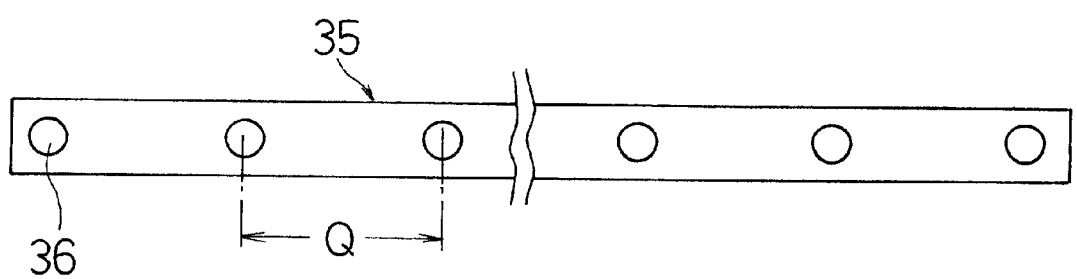
Figure 10C:
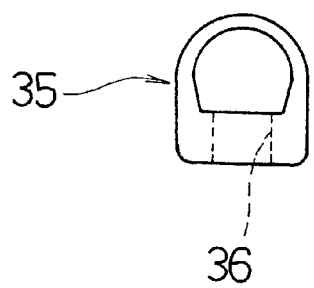
Figure 11:
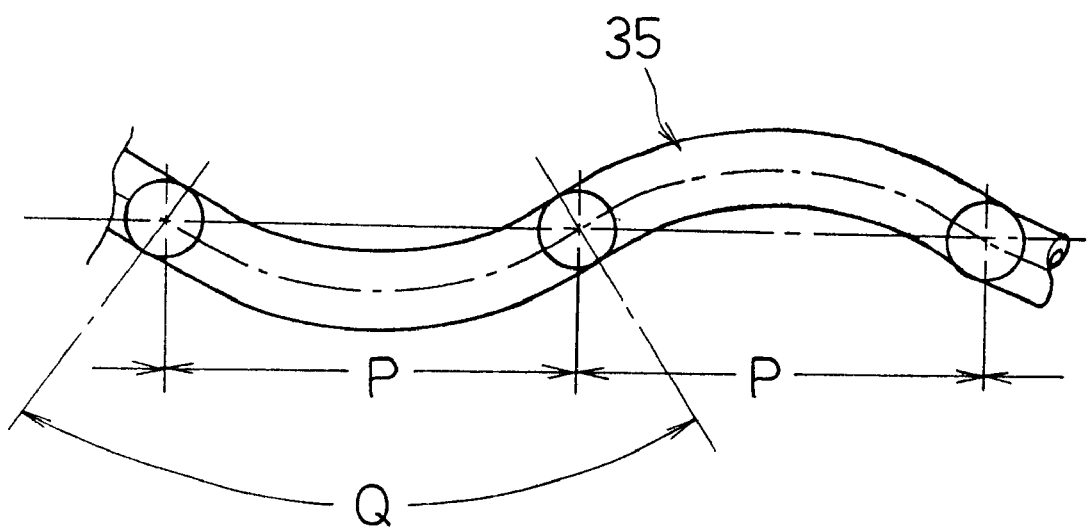
FIG. 11 is an illustrative view of the installed state of the discharge gas tube in FIG. 10.

In the foregoing embodiment, the discharge gas tubes 17 are fabricated by injection molding with the discharge outlet connecting sections 21 and the bellows 22 being integrally formed therewith, and have a significantly varying sectional shape in the axial direction thereof. FIG. 10 shows a modified example of discharge gas tubes 35 having the same sectional shape throughout the length thereof. Such discharge gas tube 35 can be fabricated inexpensively by means of extrusion molding. This type of discharge gas tube 35 is formed in a tunnel shape comprising a flat section of large thickness in the bottom portion thereof, connecting holes 36 for engaging with the discharge outlets 14 of the safety vents 10 being formed at a prescribed pitch interval Q in the aforementioned flat section. The pitch interval Q between the connecting holes 36 in the discharge gas tube 35 is set to a larger interval than the pitch interval P between the discharge outlets 14 when the battery modules 2 are arranged normally, and as shown in FIG. 11, the gas tubes 35 are installed in a curved state, so that any change in the intervals between the discharge outlets 14 of the safety vents 10 due to expansion of the battery modules 2 can be absorbed by displacement of the discharge gas tubes 35.

Figure 12:
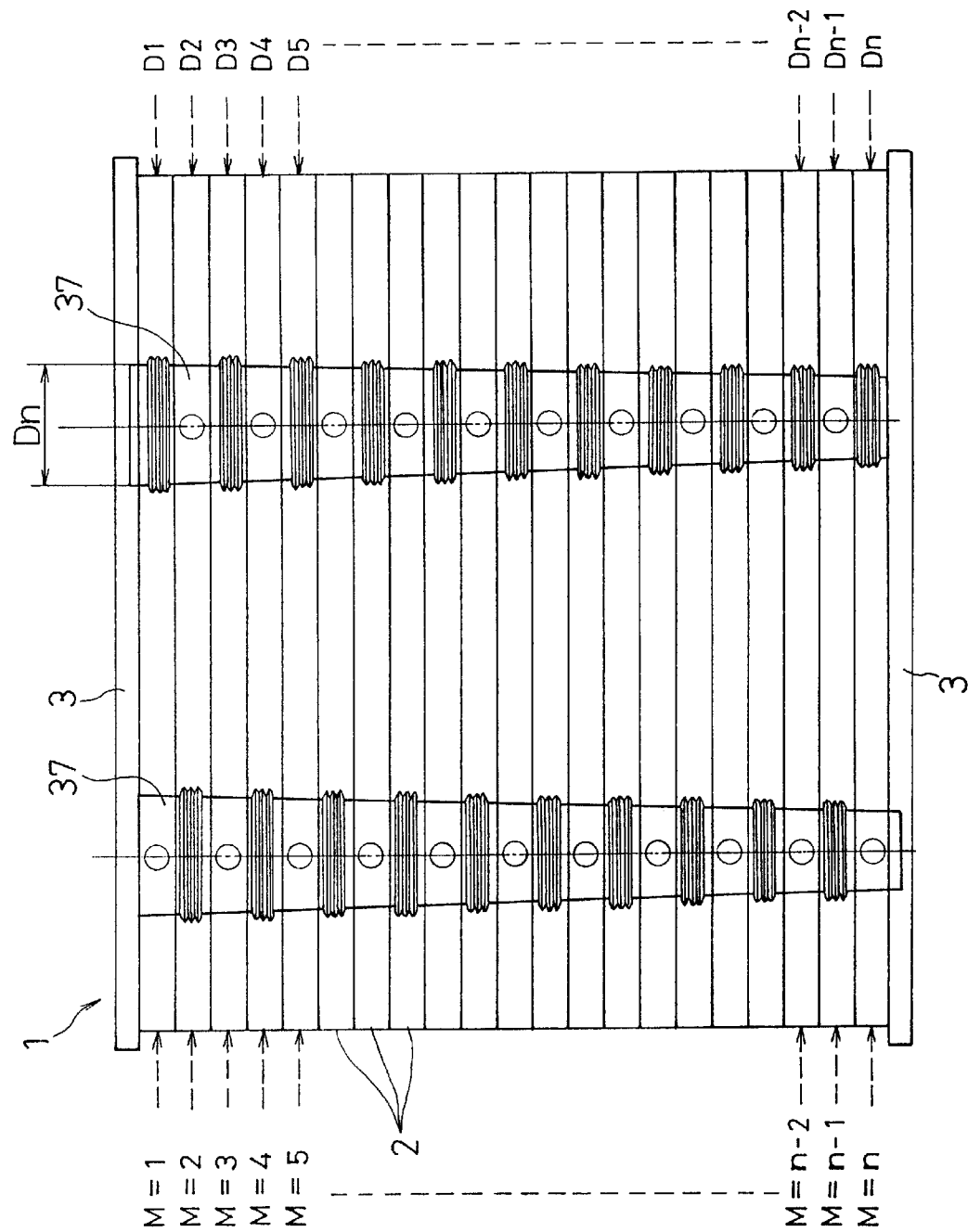
FIG. 12 is a plan view showing the general composition of another embodiment of a battery pack according to the present invention.

Also, in the foregoing embodiment, an example was given where the sectional dimensions of the discharge gas tubes were equal along the alignment direction of the battery modules 2 in the battery pack 1. It is also possible, as illustrated in FIG. 12, to provide discharge gas tubes 37 having a diameter Dn (n=1~n) which varies progressively in the direction of alignment of the battery modules 2. The temperature of the respective battery modules 2 (battery number M (M=1~n)) arranged in parallel in the battery pack 1 varies progressively with the module position, according to the configurational state of the battery pack 1 and the direction of flow of the cooling medium, but if a composition is adopted in which the horizontal diameter of the corresponding discharge gas tubes 37 is caused to change in such a manner that it becomes progressively smaller, from lower temperature regions to higher temperature regions, according to the aforementioned temperature gradient, then the flow resistance to the cooling medium caused by the presence of the discharge gas tubes 37 will be reduced in the higher temperature regions, thereby improving cooling properties, whilst the flow resistance to the cooling medium caused by the presence of the discharge gas tubes 37 will be increased relatively in the lower temperature regions, thereby reducing cooling properties, so that the overall cooling properties of the battery pack are equalized.

Figure 13:
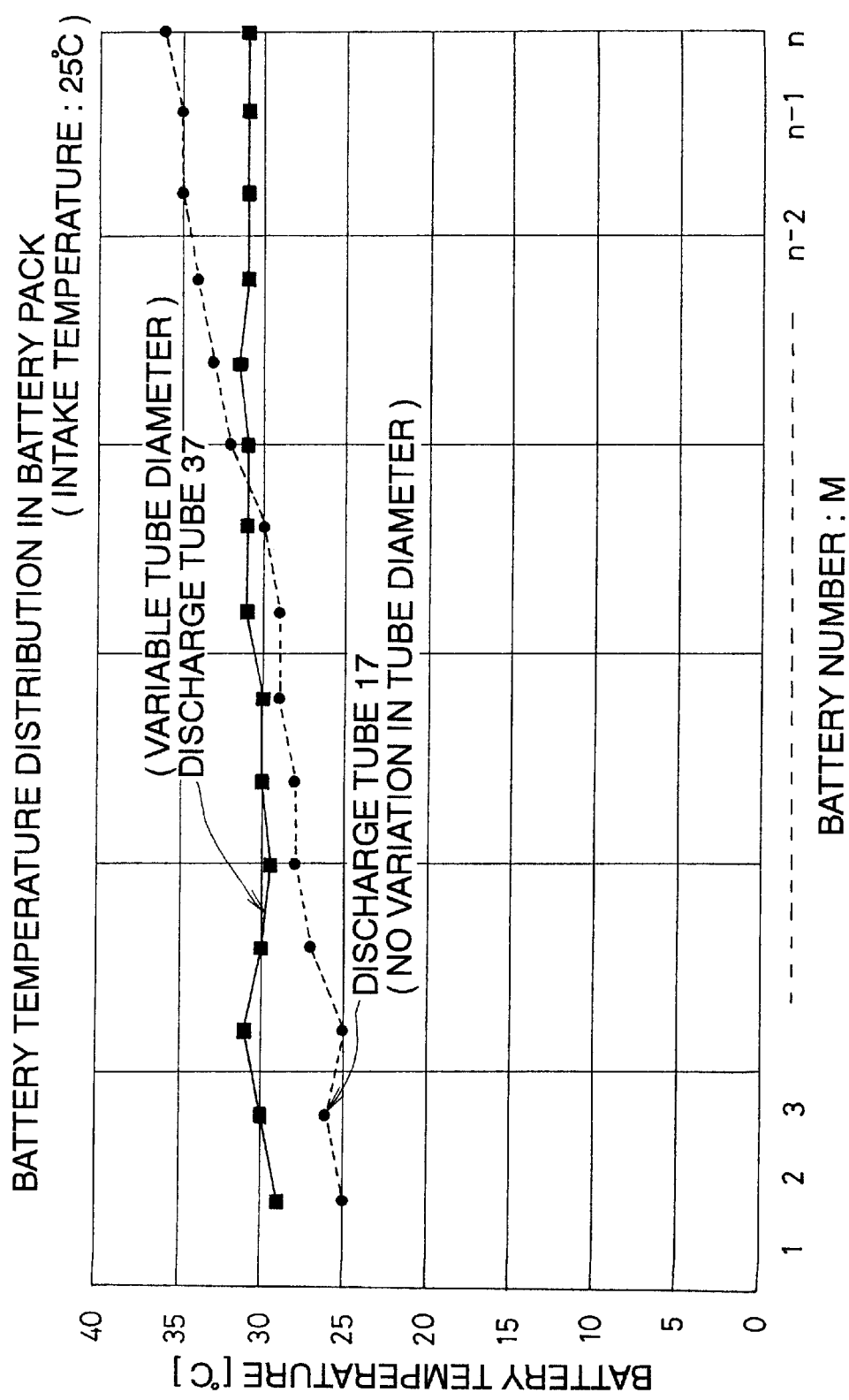
FIG. 13 is a graph showing temperature distribution inside a battery pack in the aforementioned embodiment.
Figure 14:
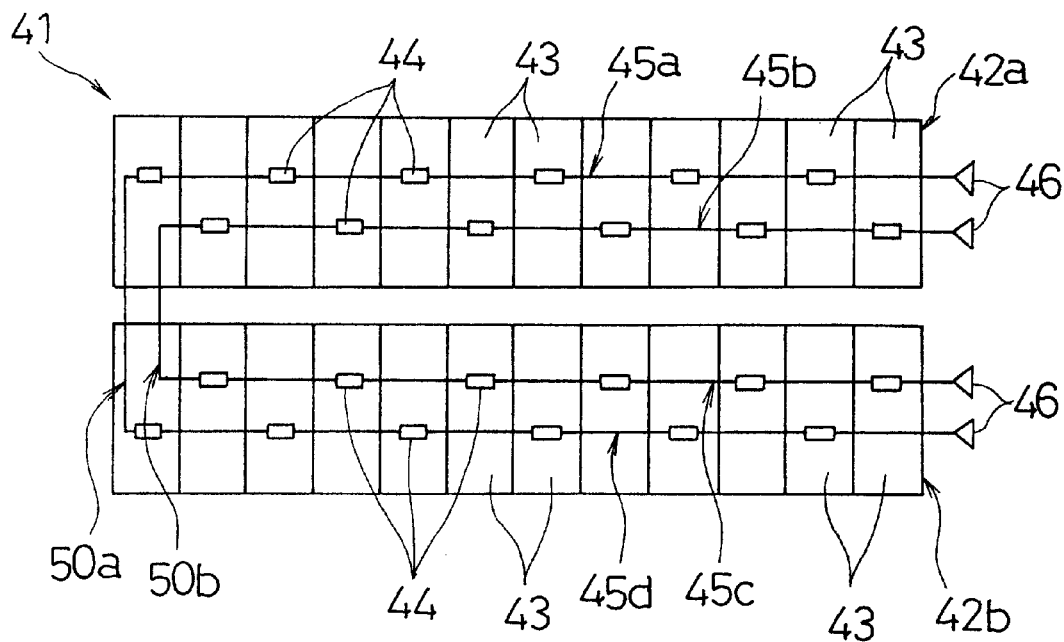
FIG. 14 is a plan view showing the general composition of a gas discharging device in a conventional battery pack.
Figure 15:
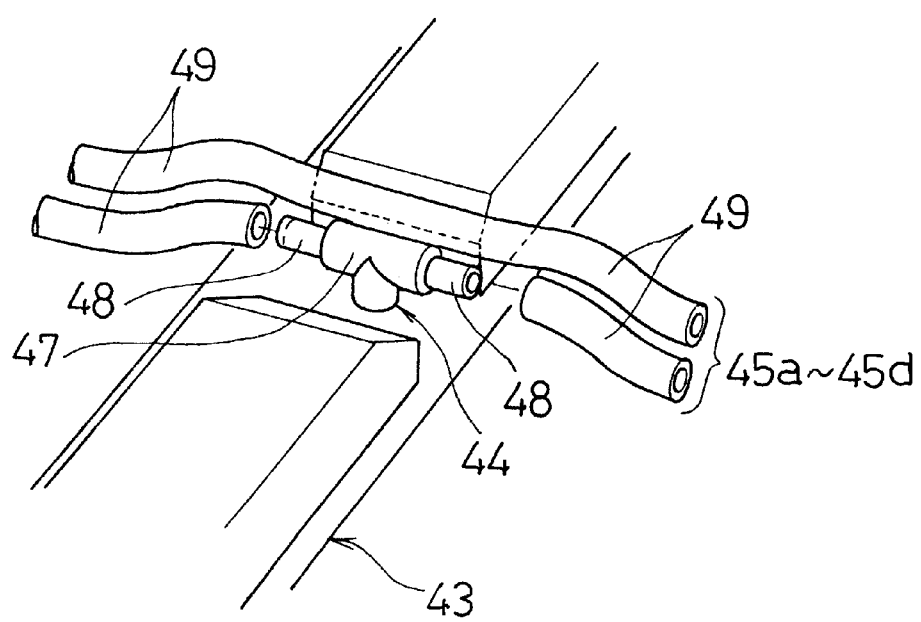
FIG. 15 is an oblique view of the principal parts of a conventional battery pack.

Whereas a temperature gradient is generated in the direction of alignment of the battery modules 2 when discharge gas tubes 17 having an invariable horizontal diameter dimension are used, as illustrated in FIG. 13, by adopting the aforementioned composition in which discharge gas tubes 37 having a varying horizontal diameter dimension are employed, it is possible to equalize the cooling properties for the respective battery modules 2 throughout the whole battery pack 1.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:
   a plurality of battery modules arranged in parallel and coupled together in such a manner as to provide a necessary power output, each of said plurality of battery modules being provided with safety vents having discharge outlets for releasing gas therethrough from the battery modules when internal pressure of a battery module has reached a predetermnined value; and
   at least one discharge gas tube connected to said discharge outlets of the safety vents and arranged along a direction in which the battery modules are aligned, wherein said at least on discharge gas tube is capable of accomodating variations in intervals between said discharge outlets of the safety vents caused by expansion of at least one of the plurality of battery modules.

2. The battery pack according to claim 1, wherein said at least one discharge gas tube is provided with bellows at portions between said discharge outlets of the safety vents.

3. The battery pack according to claim 1, wherein a length of said at least one discharge gas tube between respective adjacent ones of the discharge outlets of the safety vents is set to be longer than an interval between two adjacent ones of the battery modules in a normal state.

4. A battery pack comprising:
   a plurality of battery modules arranged in parallel and coupled together in such a manner as to provide a necessary power output, each of said plurality of battery modules being provided with safety vents having discharge outlets for releasing gas from the battery modules when internal pressure of a battery module has reached a predetermined value;
   at least one discharge gas tube connected to said discharge outlets of the safety vents and arranged along a direction in which the battery modules are aligned;
   an external discharging tube, to which one end of said at least one discharge gas tube is connected; and
   a supporting piece for attaching said external discharging tube to a fixed member of the battery pack such as to be displaceable in the direction in which the plurality of battery modules are aligned.

5. The battery pack according to claim 4, wherein said supporting piece comprises a strip of spring material having a clip portion which engages with the fixed member at one end of the plurality of battery modules, and a supporting portion for holding the external discharging tube being formed at the other end of the battery pack.

6. A battery pack comprising:
   a plurality of battery modules arranged in parallel and coupled together in such a manner as to provide a necessary power output, each of said plurality of battery modules being provided with safety vents having cylindrical discharge outlets protruded on upper faces of respective ones of the plurality of battery modules; and
   at least one discharge gas tube arranged running continuously along a direction in which the battery modules are aligned for approximately a whole length of the plurality of battery modules and having a plurality of outlet connectors having cylindrical connecting holes with which said cylindrical discharge outlets of the safety vents of respective ones of the battery modules engage in a sealed condition, wherein said cylindrical connecting holes are formed in a perpendicular direction to the longitudinal axis of the at least one discharge gas tube.

7. The battery pack according to claim 6, wherein the at least one discharge gas tube has a greater rigidity at portions of said outlet connectors.

8. The battery pack according to claim 6, wherein said cylindrical discharge outlets of the safety vents and said cylindrical connecting holes of the outlet connectors engage with each other for a length equal to or greater than an external diameter of the cylindrical discharge outlets of the safety vents.

9. The battery pack according to claim 6, wherein said cylindrical discharge outlet of each safety vent has a circumferential protrusion on a distal end engaging an upper end of the cylindrical connecting hole of each outlet connector.

10. The battery pack according to claim 9, wherein said cylindrical discharge outlet of each safety vent and said cylindrical connecting hole of each outlet connector, respectively engage with each other for a length smaller than a length of the cylindrical discharge outlet of each safety vent from under said circumferential protrusion.

11. The battery pack according to claim 6, wherein said cylindrical connecting hole of each outlet connector has a projection for providing a seal on an inner circumference in a central portion thereof in the axial direction.

12. The battery pack according to claim 6, wherein said cylindrical discharge outlet of each of the safety vents has a central portion with a circumferential protrusion, and each of the cylindrical connecting holes has an annular protrusion, which tightly presses against an outer circumference of the distal end of the cylindrical discharge outlet of the safety vent, and each of the annular protrusions is formed on the inner circumference of said cylindrical connecting holes of each outlet connector, respectively.

13. The battery pack according to claim 6, wherein a shoulder section having a high degree of hardness and projecting upwards for a significant distance above the distal end of said cylindrical discharge outlet of each safety vent is provided inside the discharge gas tube at the periphery of said cylindrical connecting hole of each outlet connector, at least on either side of the cylindrical connecting hole in the axial direction of the discharge gas tube.

14. A battery pack comprising:
- a plurality of battery modules arranged in parallel and coupled together in such a manner as to provide a necessary power output, each of said plurality of battery modules being provided with safety vents having discharge outlets, a plurality of cooling medium passages being formed between adjacent ones of the plurality of battery modules; and
- at least one discharge gas tube connected to said discharge outlets of the safety vents and arranged above the plurality of battery modules along a direction in which the battery modules are aligned, wherein a distance exists between upper faces of the battery modules and lower faces of the at least one discharge gas tube, said distance being set to a dimension whereby an increase in the flow resistance of a cooling medium flowing through the cooling medium passages due to presence of the at least one discharge gas tube is less than 10%.

15. A batter pack comprising:
- a plurality of battery modules arranged in parallel and coupled together in such a manner as to provide a necessary power output, each of said plurality of battery modules being provided with safety vents having discharge outlets, a plurality of cooling medium passages being formed between adjacent ones of the plurality of battery modules; and
- at least one discharge gas tube connected to said discharge outlets of the safety vents and arranged above the plurality of battery modules along a direction in which the battery modules are aligned, wherein each of said at least one discharge gas tube has a smaller horizontal diameter dimension other than other portions thereof at locations facing said cooling medium passages.

16. A battery pack comprising:
- a plurality of battery modules arranged in parallel and coupled together in such a manner as to provide a necessary power output, each of said plurality of battery modules being provided with safety vents having discharge outlets; and
- at least one discharge gas tube connected to said discharge outlets of the safety vents and arranged above the plurality of battery modules along a direction in which the battery modules are aligned, wherein the at least one discharge gas tube has a varying horizontal diameter dimension that varies, in accordance with the temperature gradient of the battery modules along the direction in which the battery modules are aligned, such as to decrease progressively from lower temperature regions to higher temperature regions.

17. A battery pack comprising:
- a plurality of batter modules arranged in parallel and coupled together in such a manner as to provide a necessary power output, each of said plurality of battery modules being provided with safety vents having discharge outlets; and
- at least one discharge gas tube connected to said discharge outlets of the safety vents and arranged above the plurality of battery modules along a direction in which the battery modules are aligned, wherein a diameter, a thickness, and a material of the at least one discharge gas tube is elected in such a matter that there is no possibility that the density of hydrogen gas inside a sealed space contained by the battery pack will reach 2% or above within a period of 0.25 years, due to hydrogen gas permeating the at least one discharge gas tube.

* * * * *